United States Patent
Suzuki et al.

(10) Patent No.: US 9,758,621 B2
(45) Date of Patent: Sep. 12, 2017

(54) ETHYLENEIMINE POLYMER AND METHOD FOR PRODUCING THE SAME

(71) Applicant: NIPPON SHOKUBAI CO., LTD., Osaka (JP)

(72) Inventors: Seiichi Suzuki, Osaka (JP); Taisuke Kasahara, Osaka (JP)

(73) Assignee: NIPPON SHOKUBAI CO., LTD., Osaka (JP)

( * ) Notice: Subject to any disclaimer, the term of this patent is extended or adjusted under 35 U.S.C. 154(b) by 0 days.

(21) Appl. No.: 14/910,343

(22) PCT Filed: Aug. 4, 2014

(86) PCT No.: PCT/JP2014/070517
§ 371 (c)(1),
(2) Date: Feb. 5, 2016

(87) PCT Pub. No.: WO2015/020012
PCT Pub. Date: Feb. 12, 2015

(65) Prior Publication Data
US 2016/0185906 A1   Jun. 30, 2016

(30) Foreign Application Priority Data
Aug. 7, 2013 (JP) ................................. 2013-164193

(51) Int. Cl.
*C08G 73/04* (2006.01)
*C08G 73/02* (2006.01)
*C09D 11/102* (2014.01)
*C08G 73/00* (2006.01)
*C08F 6/10* (2006.01)
*C08F 126/08* (2006.01)

(52) U.S. Cl.
CPC ..... *C08G 73/0206* (2013.01); *C08G 73/0213* (2013.01); *C09D 11/102* (2013.01)

(58) Field of Classification Search
CPC ..................................................... C08G 73/04
USPC ........................................................ 528/424
See application file for complete search history.

(56) References Cited

U.S. PATENT DOCUMENTS

| | | | |
|---|---|---|---|
| 3,203,910 A | 8/1965 | Wilson | |
| 4,032,480 A | 6/1977 | Zhuk et al. | |
| 6,444,769 B2* | 9/2002 | Suzuki | C08G 73/0213 526/258 |
| 6,451,961 B2* | 9/2002 | Suzuki | C08G 73/0213 528/422 |
| 2001/0014730 A1 | 8/2001 | Suzuki et al. | |
| 2001/0039318 A1 | 11/2001 | Suzuki et al. | |
| 2004/0054127 A1 | 3/2004 | Jin | |
| 2005/0176897 A1 | 8/2005 | Kanzaki et al. | |
| 2011/0318298 A1 | 12/2011 | Hayashi et al. | |

FOREIGN PATENT DOCUMENTS

| | | |
|---|---|---|
| JP | S52-010400 A | 1/1977 |
| JP | 2004162017 | 6/2004 |

OTHER PUBLICATIONS

Official Japanese Notice of Reason of Refusal, dated Nov. 8, 2016 (Translated).
Official Chinese First Office Action, dated Nov. 28, 2016 (Translated).
Extended European Search Report, Application PCT/JP2014/070517, dated Feb. 28, 2017.

* cited by examiner

*Primary Examiner* — Duc Truong
(74) *Attorney, Agent, or Firm* — Porzio Bromberg & Newman P.C.

(57) ABSTRACT

Provided is an ethyleneimine polymer which exhibits excellent close adhesion properties and adhesive properties and has a low water content, and a method for producing the same.
An ethyleneimine polymer, in which the number average molecular weight (Mn) of the ethyleneimine polymer measured by gel permeation chromatography in terms of pullulan is 13,000 or more and the value obtained by dividing the weight average molecular weight by the number average molecular weight (weight average molecular weight: Mw/number average molecular weight: Mn=degree of dispersion) of the ethyleneimine polymer is from 1.4 to 3.0.

12 Claims, No Drawings

ETHYLENEIMINE POLYMER AND METHOD FOR PRODUCING THE SAME

TECHNICAL FIELD

The present invention relates to an ethyleneimine polymer and a method for producing the same. More particularly, the present invention relates to a method for producing an ethyleneimine polymer, in which ethyleneimine is subjected to a ring-opening polymerization, and an ethyleneimine polymer.

BACKGROUND ART

Hitherto, ethyleneimine polymers have been widely utilized in the fields of paper processing agents, adhesives, pressure sensitive adhesives, paints, inks, textile treatment agents, coagulative separating agents, cosmetics, toiletries, dispersing agents, and the like. However, it is difficult to conduct the polymerization of ethyleneimine while controlling the polymerization temperature, the molecular weight, the branch structure, and the like since ethyleneimine is highly reactive, and thus various methods for polymerizing ethyleneimine have been proposed.

A method for producing an aqueous solution of an ethyleneimine polymer having a concentration of from 25 to 50% and a high molecular weight is disclosed in JP 43-8828 B, JP 2001-213959 A, JP 2001-288265 A (US 2001/039318 A1). Specifically, a method for producing an aqueous solution of an ethyleneimine polymer is proposed in which ethyleneimine is polymerized in the presence of water and a catalyst such as a polyhalogenated compound represented by 1,2-dichloroethane.

The aqueous solution of an ethyleneimine polymer thus obtained is the aqueous solution of an ethyleneimine polymer which has the highest molecular weight in the current industrial level. Specifically, the number average molecular weight (hereinafter, abbreviated as Mn) of the ethyleneimine polymer measured by gel permeation chromatography (hereinafter, also referred to as "GPC") in terms of pullulan of the molecular weight standard substance is 10,000 or more.

However, the ethyleneimine polymer obtained by the above method does not exhibit sufficient adhesive properties compared to the used amount in the case of being used in an application such as an adhesive, and thus it is desired to develop an ethyleneimine polymer which can secure sufficient adhesive properties when used in a smaller amount.

SUMMARY OF INVENTION

The invention provides an ethyleneimine polymer which exhibits excellent close adhesion properties and adhesive properties and has a low water content, and a method for producing the same.

The present inventors have believed that the factor to inhibit the close adhesion properties and the adhesive properties is that the low molecular weight component is contained in the ethyleneimine polymer to be obtained in a significant amount from a broad molecular weight distribution (degree of dispersion (Mw/Mn): 10 or more) thereof. In addition, the present inventors investigated the kind of catalyst, the water content, the method for adding the monomer or the catalyst, and the like, in the belief that the factor of a low molecular weight and a broad molecular weight distribution is that the polymerization is conducted under a condition to contain a great amount of water and a polyhalogenated compound catalyst and the fact that it is difficult to control the polymerization when water is contained in a small amount is an obstacle to conduct the polymerization under a low water content condition. As a result, it has been found out that an ethyleneimine polymer which has both a high number average molecular weight and a narrow molecular weight distribution is obtained under a low water content condition unlike the method of the prior art. Moreover, it has been confirmed that according to the ethyleneimine polymer which is obtained in this manner and has the above physical properties, sufficient adhesive properties can be secured when the ethyleneimine polymer is used in a smaller amount in the case of using it in an application such as an adhesive, thereby completing the invention.

That is, according to an aspect of the invention, there is provided an ethyleneimine polymer, wherein a number average molecular weight (Mn) of the ethyleneimine polymer measured by gel permeation chromatography in terms of pullulan is 13,000 or more and a degree of dispersion of the ethyleneimine polymer is from 1.4 to 3.0.

According to another aspect of the invention, there is provided a method for producing an ethyleneimine polymer, the method including: polymerizing ethyleneimine under a temperature condition of from 50 to 150° C. in the presence of water at from 1.0 to 40% by mass with respect to 100% by mass of ethyleneimine and a catalyst at from 0.3 to 5% by mass with respect to 100% by mass of ethyleneimine.

DESCRIPTION OF EMBODIMENTS

An aspect of the invention is an ethyleneimine polymer, in which the number average molecular weight (Mn) of the ethyleneimine polymer measured by gel permeation chromatography in terms of pullulan is 13,000 or more and the value obtained by dividing the weight average molecular weight by the number average molecular weight (weight average molecular weight: Mw/number average molecular weight: Mn=degree of dispersion) of the ethyleneimine polymer is from 1.4 to 3.0.

By having such a configuration, an ethyleneimine polymer which exhibits excellent close adhesion properties and adhesive properties and has a low water content and can be easily dehydrated depending on the application is obtained.

The reason for that the ethyleneimine polymer of the invention exhibits excellent close adhesion properties and adhesive properties is believed as follows.

Ethyleneimine polymers have an amino group in the structure thereof, and the amino group forms a hydrogen bond with a hydroxyl group, an ionic bond with a carboxyl group, and a covalent bond with a carbonyl group. In addition, the ethyleneimine polymers have a polar group (amino group) and a hydrophobic group (ethylene group) in the structure and thus bond with different materials. The ethyleneimine polymer obtained by the invention has a high molecular weight and a narrow molecular weight distribution as compared to the product of the prior art. The bond formed per one molecule or interaction in such an ethyleneimine polymer is more than in that which contains a low molecular weight component of the prior art, and as a result, the bonding power between the ethyleneimine molecules and the bonding power between the adhesive surface-ethyleneimine molecules are believed to be robuster.

Incidentally, the mechanism described above is based on presumption, and the invention is not limited to the mechanism in any way.

Hereinafter, preferred embodiments of the invention will be described. Incidentally, the invention is not limited to the following embodiments.

In addition, in the present specification, the term "X to Y" to indicate the range means "X or more and Y or less", the term "weight" and the term "mass", the term "% by weight" and the term "% by mass", and the term "parts by weight" and the term "parts by mass" are regarded as synonymous with each other. In addition, the operations and the measurement of physical properties and the like are conducted under a condition of room temperature (20 to 25° C.)/relative humidity of from 40 to 50% unless otherwise stated.

<Ethyleneimine Polymer>

An ethyleneimine polymer is a water-soluble polymer obtained by polymerizing ethyleneimine and a polymer compound having a branched structure containing a primary amine, a secondary amine, and a tertiary amine. The ethyleneimine polymer is highly reactive as compared to other polymer compounds, and it is subjected to a reaction with a dialdehyde compound, an alkyl halide compound, an isocyanate compound, an epoxy compound such as epichlorohydrin, a cyanamide compound, a guanidine compound, urea, a carboxylic acid compound, a cyclic acid anhydride compound, and an acyl halide compound so as to be used as chemically modified ones depending on the application.

The ethyleneimine polymer in the invention is one which has a high number average molecular weight and a narrow molecular weight distribution unlike an ethyleneimine polymer of the prior art which has a high number average molecular weight (10,000 or more) but a broad molecular weight distribution (degree of dispersion (Mw/Mn): 10 or more). Specifically, the number average molecular weight (Mn) is 13,000 or more, preferably 19,000 or more, and more preferably 25,000 or more. It is difficult to obtain sufficient close adhesion properties and adhesive properties in the case of using the ethyleneimine polymer in an adhesion promoter and the like when the number average molecular weight thereof is less than 13,000. In addition, the number average molecular weight is 50,000 or less, preferably 45,000 or less, and more preferably 40,000 or less. It is not preferable that the number average molecular weight exceeds 50,000 since it is difficult to stir the ethyleneimine polymer uniformly at the time of polymerization.

Furthermore, the value obtained by dividing the weight average molecular weight by the number average molecular weight (weight average molecular weight: Mw/number average molecular weight: Mn=degree of dispersion) which indicates the molecular weight distribution is 3.0 or less, preferably 2.8 or less, and more preferably 2.6 or less. It is not preferable that the degree of dispersion exceeds 3.0 since the low molecular weight component to be the factor of deterioration in adhesive properties increases.

The weight average molecular weight and the number average molecular weight in the invention can be measured by a known method in which the pullulan is used as a standard substance and gel permeation chromatography (GPC) is adopted. The following conditions are adopted as the measurement conditions for GPC in the invention.
Measuring device; manufactured by Shimadzu Corporation
Column used; Shodex Asahipac GF-710HQ+GF-510HQ+GF-310HQ manufactured by SHOWA DENKO K.K.
Eluent; one prepared by adding acetic acid to 0.2 mol % aqueous solution of monoethanolamine and adjusting the pH to 5.1
Standard substance; pullulan P-82 (manufactured by Wako Pure Chemical Industries, Ltd.)
Detector; differential refractometer (manufactured by Shimadzu Corporation)

The method for producing an ethyleneimine polymer according to the invention is not particular limited. However, in the synthetic method of the prior art, a great amount of water is used as the reaction solvent, and thus the application of the ethyleneimine polymer thus produced is limited to those which are not affected by water, such as a paper making agent or an enzyme immobilizing agent. For this reason, a polymerization method is preferable in which an ethyleneimine polymer is polymerized under a low water content condition so as to easily dehydrate.

In addition, in the synthetic method of the prior art, the molecular weight is usually controlled by adjusting the amount of a polyhalogenated compound added with respect to ethyleneimine. However, as described in Example of Patent Document 1, the viscosity rapidly increases when the amount of the polyhalogenated compound added is slightly excessive and gelation and solidification proceed in the worst case. On the other hand, the targeted molecular weight is not obtained when the added amount is slightly lacking. In other words, it was required to adjust the amount of the polyhalogenated compound added in a narrow specified range in order to control the molecular weight.

Hence, the product obtained by the method which is a representative example of a method for producing an ethyleneimine polymer having a high molecular weight in the methods of the prior art and in which ethyleneimine is polymerized by using a polyhalogenated compound such as 1,2-dichloroethane as a catalyst has a problem that the close adhesion properties and the adhesive properties are not sufficiently exhibited, water content is high so as to be difficult to dehydrate, and thus the application thereof is limited.

On the other hand, as an example of the method for producing an ethyleneimine polymer according to the invention, according to another aspect of the invention, a method for producing an ethyleneimine polymer is provided in which ethyleneimine is polymerized at from 50 to 150° C. in the presence of water at from 2.0 to 10% by mass with respect to 100% by mass of the ethyleneimine and a catalyst at from 0.3 to 5% by mass with respect to 100% by mass of the ethyleneimine. According to the method, it is possible to obtain the ethyleneimine polymer according to the present application as a product having a low water content, and thus the ethyleneimine polymer is easily dehydrated and advantageous for commercialization. Hereinafter, a preferred embodiment of the producing method according to the present aspect will be described.

[Ethyleneimine]

Ethyleneimine which is used in the producing method of the present aspect is not particularly limited, and examples of the synthetic method thereof may include a method in which halogenated ethylamine is subjected to intramolecular ring closure by concentrated alkali in a liquid phase, a method in which monoethanolamine sulfate ester is subjected to intramolecular ring closure by hot concentrated alkali (hereinafter, also referred to as the liquid phase method), or a method in which monoethanolamine is subjected to the catalytic gas phase intramolecular dehydration reaction (hereinafter, also referred to as the vapor phase method).

As ethyleneimine obtained by the vapor phase method, crude ethyleneimine recovered by subjecting an ethyleneimine-containing reaction mixture obtained by the catalytic intramolecular dehydration reaction of monoethanolamine to a simple distillation operation can be used as a raw material for polymerization (JP 2001-213958 A). Incidentally, in the case of polymerizing crude ethyleneimine, for example as described in JP 2001-261820 A, it is possible to obtain a high-purity ethyleneimine polymer that meets the industrially required quality standards by subjecting the ethyleneimine polymer (hereinafter, referred to as the crude ethyleneimine polymer in some cases) to a simple purification operation.

It is also possible to utilize purified ethyleneimine obtained by highly purifying the ethyleneimine-containing reaction mixture as a raw material for the ethyleneimine polymer synthesis. In this case, the ethyleneimine-containing reaction mixture contains heavy impurities such as unreacted monoethanolamine, an oligomer of ethyleneimine, a ketone such as acetaldehyde, and the Schiff base produced by the reaction of acetaldehyde with monoethanolamine of the raw material and light impurities such as light amines including ammonia, methylamine, and ethylamine and acetonitrile in addition to ethyleneimine of the targeted substance, and thus purified ethyleneimine obtained by removing these impurities through a high purification process is subjected to the polymerization reaction.

The technique to produce an ethyleneimine polymer using purified ethyleneimine obtained through a high purification process cannot avoid an increase in production cost associated with the implementation of a high purification process, it cannot be said that the technique is industrially advantageous, and thus crude ethyleneimine is preferably used as the ethyleneimine raw material.

[Catalyst]

The catalyst is not particularly limited, and it is possible to use those commonly used in the polymerization of ethyleneimine, and for example, it is possible to use a mineral acid containing halogen, such as hydrochloric acid or hydrobromic acid, a Lewis acid such as phosphoric acid, carbon dioxide, an organic acid, or boron trifluoride, an organic halogen compound such as chloromethane or bromomethane, and a mono-halogenated alcohol compound such as 2-chloroethanol, 3-chloro-1-propanol, 3-chloro-2-propanol, 3-chloro-1,2-propanediol, 3-chlorobenzyl alcohol, 3-chloro-2,2-dimethyl-1-propanol, 2-(2-chloroethoxy)ethanol, 2-bromoethanol, 3-bromo-1-propanol, 3-bromo-2-propanol, or 3-bromo-1,2-propanediol, and two or more kinds thereof may be concurrently used.

Among these, a water-soluble organic compound having at least one halogen element and a hydrophilic substituent or a water-soluble inorganic acid containing at least one halogen element is preferable as the catalyst.

In a case where the catalyst is soluble in water, the catalyst is easily incorporated into the reaction system containing ethyleneimine and water and thus an ethyleneimine polymer having a high molecular weight and a narrow molecular weight distribution is likely to be obtained. In addition, a mono-halide is preferable from the viewpoint of preventing the crosslinkage due to the catalyst. In particular, a water-soluble mono-halogenated organic compound that is poorly volatile (having a high boiling point) is preferable from the viewpoint of handling or safety. As the water-soluble mono-halogenated organic compound, a mono-halogenated alcohol is preferable since it is liquid and close to neutral, and a mono-chloro alcohol is more preferable from the viewpoint of the reactivity or the molecular weight or degree of dispersion of the ethyleneimine polymer to be obtained.

As the mono-chloro alcohol, from the viewpoint of solubility in water, those which have 4 or less carbon atoms/polar groups is preferable, those which have 3 or less carbon atoms/polar groups is more preferable, and those which have 2 or less carbon atoms/polar groups is even more preferable. As specific compounds, 2-chloroethanol, 3-chloro-1-propanol, and 2-chloroethoxyethanol are preferable and 2-chloroethanol is even more preferable among these.

As the inorganic acid which contains one halogen atom, an inorganic acid containing chlorine is preferable. The inorganic acid which contains chlorine is not particularly limited, but examples thereof may include a chlorine oxyacid such as hypochlorous acid, chlorous acid, hydrochloric acid, or perchloric acid, a chloro acid such as chlorocarbonic acid, chlorosulfuric acid, or chlorosulfurous acid, and hydrochloric acid, and hydrochloric acid is preferable among these.

The lower limit of the amount of the catalyst added is 0.3% by mass or more and preferably 0.5% by mass or more with respect to 100% by mass of the ethyleneimine. It is not preferable that the amount of the catalyst added is less than 0.3% by mass since a sufficient polymerization reaction rate is not obtained. In addition, the upper limit of the amount of the catalyst added is 5% by mass or less, preferably 3% by mass or less, and even more preferably less than 2% by mass. It is not preferable that the amount of the catalyst added exceeds 5% by mass since a sufficiently high molecular weight is not obtained.

[Water]

The lower limit of the amount of water added is 2% by mass or more and preferably 5% by mass or more with respect to 100% by mass of the ethyleneimine. It is not preferable that the amount of water added is less than 2% by mass since a rapid polymerization reaction is likely to take place and it is difficult to control the polymerization reaction. In addition, the upper limit of the amount of water added is 40% by mass or less and preferably 20% by mass or less. It is not preferable that the amount of water added exceeds 40% by weight since not only the ethyleneimine polymer of the invention is not obtained but also the energy required for removing water enormously increases, which leads to an increase in cost of the product.

[Methods for Adding Catalyst, Water, and Ethyleneimine]

The method for adding the catalyst is not particularly limited, but it is possible to use any of the following three methods as an example.

(Collective Addition)

It is a method in which predetermined amounts of water and the catalyst are charged into the reaction vessel in advance and ethyleneimine is added to this at a predetermined temperature.

(Continuous Addition)

It is a method in which a predetermined amount of water is charged into the reaction vessel and ethyleneimine and the catalyst are continuously added to this at a predetermined temperature. Incidentally, it is preferable to start the addition of the catalyst earlier than the addition of ethyleneimine by about 15 minutes when the continuous addition is adopted in order to prevent that the monomer is present in an excessive amount and thus the reaction rapidly proceeds.

(Intermittent Addition)

It is a method in which a predetermined amount of water is charged into the reaction vessel and the catalyst is intermittently added to this several times as well as ethyleneimine is continuously added to this at a predetermined temperature.

It is possible to obtain the ethyleneimine polymer according to the invention by using any of the three methods described above, but the continuous addition is even more preferable, the intermittent addition is more preferable, and the collective addition is preferable from the viewpoint of obtaining a higher molecular weight.

The rate of ethyleneimine added is determined in consideration of the reaction rate and the capacity or heat removal capability of the polymerization apparatus in any of the three catalyst adding methods described above from the viewpoint of suppressing a rapid reaction and controlling the reaction. In general, the catalyst is continuously added at an addition rate such that the addition is completed preferably in from 0.5 to 20 hours and more preferably in from 4 to 10 hours.

Incidentally, it is also possible to change the addition rate during the polymerization in order to control the polymerization temperature in the continuous addition and the intermittent addition.

In addition, it is preferable to conduct the addition while stirring the mixture using a stirring blade or the like in order to control the polymerization temperature at the time of the addition.

[Reaction Condition]

In the invention, the lower limit of the reaction solution temperature at the time of polymerizing ethyleneimine is 50° C. or higher, preferably 70° C. or higher, and more preferably 80° C. or higher. It is not economical when the reaction solution temperature is less than 50° C. since the polymerization time increases. In addition, the upper limit of the reaction solution temperature is 150° C. or lower, preferably 100° C. or lower, and more preferably 90° C. or lower. It is difficult to obtain an ethyleneimine polymer having a high molecular weight when the reaction solution temperature exceeds 150° C.

In the invention, a heat medium such as warm water, water vapor, or heated oil may be used if necessary in order to remove the reaction heat. The upper limit of the temperature of the heat medium is not particularly limited, and it may be a heat medium temperature that is lower than the reaction solution temperature and can control the reaction temperature.

By maintaining the temperature of the heat medium, the reaction solution is prevented from being highly viscous locally during the reaction of ethyleneimine, it is possible to conduct uniform polymerization without local retention by highly efficient stirring, and thus it is possible to conduct the reaction of ethyleneimine uniformly and efficiently.

The aging in the invention refers to the polymerization after the polymerization of ethyleneimine is finished and preferably after 95% or more of ethyleneimine supplied is consumed, the reaction mixture is aged at from 50 to 150° C. and preferably from 70 to 100° C. It is possible to conduct the aging efficiently when it is 50° C. or higher. In addition, it is possible to prevent thermal decomposition of the ethyleneimine polymer produced and to obtain a high-quality polymer when it is 150° C. or lower. The aging time is usually from 0.5 to 20 hours and preferably from 1 to 10 hours.

In the invention, the polymerization of ethyleneimine is conducted in an inert gas atmosphere having an oxygen concentration of preferably 2% by volume or less, more preferably 1% by volume or less, and even more preferably 0.5% by volume or less. It is possible to suppress coloration of the ethyleneimine polymer and to suppress coloration of the ethyleneimine polymer during preservation or storage when the oxygen concentration is 2% by volume or less. The inert gas is not particularly limited, but for example, nitrogen, helium, or argon can be used, and nitrogen is suitably used.

The pressure at the time of the polymerization may be any of normal pressure, reduced pressure, increased pressure, and the polymerization is usually conducted at from 0 to 10 MPaG and preferably from 0 to 2 MPaG. The aging of the reaction mixture is usually conducted at from 0 to 10 MPaG and preferably from 0 to 2 MPaG. Here, MPaG (megapascal gauge) refers to the gauge pressure.

The reactor used for the polymerization reaction and the aging treatment is not particularly limited, but those which are equipped with a stirrer for heat removal, diffusion, and reaction promotion since the viscosity increases during the polymerization and a thermometer and a cooling device for controlling the reaction are generally used.

The purification of the ethyleneimine polymer after the reaction can be conducted, for example, by the method such as bubbling of an inert gas described in JP 2013-71967 A.

As the method for removing water from the aqueous solution of ethyleneimine polymer obtained in the invention, it is possible to easily decrease the water content to 1% by mass or less by heating the aqueous solution of ethyleneimine polymer at a temperature equal to or higher than the boiling point of water. In addition, it is possible to further easily remove water by combining the dehydration under reduced pressure, the concurrent use of a carrier gas such as nitrogen, the concurrent use of an azeotrope of water with a solvent, and the like.

The ethyleneimine polymer according to the invention and modified products thereof are industrially widely used in applications such as a papermaking agent, a laminate anchor agent of paper, cloth, OPP, and PET films, a heavy metal chelating agent, an additive for metal plating, a foam fire extinguishing agent, improvement in close adhesion properties of a vinyl chloride-based adhesive, a crosslinking agent of an epoxy resin, improvement in close adhesion properties of an ethylene vinyl acetate copolymer (EVA), polyvinyl acetate (PVAc), and polyvinyl alcohol (PVA), improvement in close adhesion properties of, modification of a pressure sensitive adhesive, an adhesion promoter for film printing ink (claim 5), improvement in close adhesion properties of a paint, a dispersing agent of a pigment and the like, an enzyme immobilizing agent, cement for petroleum mining, water treatment (coagulant), a scale inhibitor, surface modification of glass and carbon fibers, a dye fixing agent, a detergent for textile and tableware, a metal corrosion inhibitor, a wood preservative, hair care products, an adsorbent of carbon dioxide, chlorine, nitrogen oxides, sulfur oxides, hydrogen sulfide, and aldehydes, an antislipping agent for polyvinyl acetal-based film, improvement in heat resistance and oil resistance of thermoplastic polymers such as polyamide, polyacetal, polyolefin, polyester, PVC, and polycarbonate, an anti-static agent of polyolefin, a cross-linking agent of a polymer containing a cyclic acid anhydride group, and a surface modifier of a water absorbent resin.

A preferred application is an adhesion promoter for film printing ink among them. Specifically, the adhesive properties to the film are improved when the ethyleneimine polymer of the invention is blended into the ink composition containing polyvinyl butyral as a binder.

EXAMPLES

Hereinafter, the invention will be specifically described with reference to Examples, but the invention is not limited thereto. Incidentally, in Examples, the term "parts" or "%" refers to the term "parts by mass" or "% by mass" unless otherwise stated.

Example 1

Into a reactor that was equipped with a thermometer, a reflux condenser, and a stirrer and had a capacity of 0.5 L, 18.5 g of water and 7.03 g of 2-chloroethanol were charged and heated. After the temperature was raised to 90° C., 370 g of ethyleneimine was added thereto over 8 hours while maintaining the temperature at 90° C. The resultant was aged for 1 hour at 90° C. after the addition of ethyleneimine was finished, thereby obtaining an ethyleneimine polymer. The molecular weight thereof was measured by GPC, and the result was Mn: 17494 and Mw/Mn: 2.6.

Example 2

An ethyleneimine polymer was obtained in the same manner as in the Example 1 except that the polymerization temperature was set to 80° C. The molecular weight thereof was measured by GPC, and the result was Mn: 23139 and Mw/Mn: 2.7.

Example 3

Into a reactor that was equipped with a thermometer, a reflux condenser, and a stirrer and had a capacity of 0.5 L, 18.5 g of water was charged and heated. After the temperature was raised to 100° C., 7.03 g of 2-chloroethanol and 370 g of ethyleneimine were respectively added thereto over 8 hours while maintaining the temperature of the reaction mixture at 100° C. The resultant was aged for 1 hour at 100° C. after the solution (or composition) of ethyleneimine was added, thereby obtaining an ethyleneimine polymer. The molecular weight thereof was measured by GPC, and the result was Mn: 21327 and Mw/Mn: 2.8.

Example 4

An ethyleneimine polymer was obtained in the same manner as in the Example 3 except that the polymerization temperature was set to 90° C. The molecular weight thereof was measured by GPC, and the result was Mn: 26117 and Mw/Mn: 2.6.

Example 5

An ethyleneimine polymer was obtained in the same manner as in the Example 3 except that the polymerization temperature was set to 80° C. The molecular weight thereof was measured by GPC, and the result was Mn: 31440 and Mw/Mn: 2.4.

Example 6

An ethyleneimine polymer was obtained in the same manner as in the Example 4 except that water was increased to 37 g. The molecular weight thereof was measured by GPC, and the result was Mn: 22879 and Mw/Mn: 2.5.

Example 7

An ethyleneimine polymer was obtained in the same manner as in the Example 3 except that water was increased to 74 g. The molecular weight thereof was measured by GPC, and the result was Mn: 15980 and Mw/Mn: 2.6.

Example 8

An ethyleneimine polymer was obtained in the same manner as in the Example 3 except that water was increased to 148 g. The molecular weight thereof was measured by GPC, and the result was Mn: 13473 and Mw/Mn: 1.9.

Example 9

An ethyleneimine polymer was obtained in the same manner as in the Example 4 except that the amount of 2-chloroethanol added was changed to 5.55 g. The molecular weight thereof was measured by GPC, and the result was Mn: 24193 and Mw/Mn: 2.4.

Example 10

An ethyleneimine polymer was obtained in the same manner as in the Example 4 except that the amount of 2-chloroethanol added was changed to 18.5 g. The molecular weight thereof was measured by GPC, and the result was Mn: 24324 and Mw/Mn: 2.7.

Example 11

Into a reactor that was equipped with a thermometer, a reflux condenser, and a stirrer and had a capacity of 0.5 L, 18.5 g of water was charged and heated. After the temperature was raised to 95° C., 8.14 g of 3-chloro-1-propanol and 370 g of ethyleneimine were respectively added thereto over 8 hours while maintaining the temperature of the reaction mixture at 95° C. The resultant was aged for 1 hour at 95° C. after the solution (or composition) of ethyleneimine was added, thereby obtaining an ethyleneimine polymer. The molecular weight thereof was measured by GPC, and the result was Mn: 24352 and Mw/Mn: 2.7.

Example 12

Into a reactor that was equipped with a thermometer, a reflux condenser, and a stirrer and had a capacity of 0.5 L, 18.5 g of water was charged and heated. After the temperature was raised to 95° C., 10.7 g of 2-chloroethoxyethanol and 370 g of ethyleneimine were respectively added thereto over 8 hours while maintaining the temperature of the reaction mixture at 95° C. The resultant was aged for 1 hour at 95° C. after the solution (or composition) of ethyleneimine was added, thereby obtaining an ethyleneimine polymer. The molecular weight thereof was measured by GPC, and the result was Mn: 24069 and Mw/Mn: 2.7.

Example 13

Into a reactor that was equipped with a thermometer, a reflux condenser, and a stirrer and had a capacity of 0.5 L, 18.5 g of water and 4.87 g of 38% hydrochloric acid were charged and heated. After the temperature was raised to 70° C., 370 g of ethyleneimine was added thereto over 8 hours while maintaining the temperature at 70° C. The resultant was aged for 1 hour at 70° C. after the addition of ethyleneimine was finished, thereby obtaining a solution (or composition) of an ethyleneimine polymer. The molecular weight thereof was measured by GPC, and the result was Mn: 16177 and Mw/Mn: 2.6.

Example 14

An ethyleneimine polymer was obtained in the same manner as in the Example 13 except that the polymerization temperature was set to 90° C. The molecular weight thereof was measured by GPC, and the result was Mn: 16621 and Mw/Mn: 2.0.

Example 15

An ethyleneimine polymer was obtained in the same manner as in the Example 13 except that water was changed to 37 g. The molecular weight thereof was measured by GPC, and the result was Mn: 18182 and Mw/Mn: 2.5.

Example 16

Into a reactor that was equipped with a thermometer, a reflux condenser, and a stirrer and had a capacity of 0.5 L, 148 g of water and 4.87 g of 38% hydrochloric acid were charged and heated. After the temperature was raised to 100° C., 370 g of ethyleneimine was added thereto over 8 hours while maintaining the temperature at 100° C. The resultant was aged for 1 hour at 100° C. after the addition of ethyleneimine was finished, thereby obtaining a solution (or composition) of an ethyleneimine polymer. The molecular weight thereof was measured by GPC, and the result was Mn: 13209 and Mw/Mn: 1.9.

Example 17

Into a reactor that was equipped with a thermometer, a reflux condenser, and a stirrer and had a capacity of 0.5 L, 18.5 g of water was charged and heated. After the temperature was raised to 80° C., 7.30 g of 38% hydrochloric acid and 370 g of ethyleneimine were respectively added thereto over 8 hours while maintaining the temperature at 80° C. The resultant was aged for 1 hour at 80° C. after the addition of ethyleneimine was ended, thereby obtaining a solution (or composition) of an ethyleneimine polymer. The molecular weight thereof was measured by GPC, and the result was Mn: 20831 and Mw/Mn: 2.8.

Example 18

An ethyleneimine polymer was obtained in the same manner as in the Example 17 except that 7.30 g of hydrochloric acid was added to the reaction system by intermittently adding it 6 times by 1.22 g for each time during the addition of ethyleneimine over 8 hours. The molecular weight thereof was measured by GPC, and the result was Mn: 21140 and Mw/Mn: 2.9.

(Example 19) Evaluation of Application (Adhesion Promoter for Ink)

In 59 g of ethanol, 10 g of polyvinyl butyral and 1 g of each ethyleneimine polymer were dissolved, and 30 g of titanium oxide as a pigment was mixed therewith, thereby preparing an ink. The ink was coated on an oriented polypropylene film (OPP film) in a thickness of 22.9 μm and dried under a condition of 90° C. and 5 minutes. Next, the adhesive properties of the ink were evaluated by the following two methods.
(1) The peeling state of the ink when cellophane tape is stuck on the coating film and then peeled off therefrom at an angle of 90° was visually judged (90° peel test).
(2) The peeling state of the ink when the printed film was finely folded and then unfolded was visually judged (folding peel test).

As can be seen from the results in Table 1, it has been demonstrated that the close adhesive properties of ink are improved by adding the ethyleneimine polymer of the invention. This is because the ethyleneimine polymer according to the present application has a small degree of dispersion and a high number average molecular weight unlike those obtained by the synthetic method of the prior art. Such an ethyleneimine polymer is a favorable adhesion promoter since the proportion of the high molecular weight component which contributes to the adhesive properties is greater when compared in the unit weight.

TABLE 1

| Adhesion promotor (ethyleneimine polymer) | Mn | Mw/Mn | 90° peel test | Folding peel test |
|---|---|---|---|---|
| Example 5 | 31440 | 2.4 | Not peeled off | Not peeled off |
| Nil | — | — | Significantly peeled off | Significantly peeled off |
| Comparative Example 1 | 6385 | 1.5 | Slightly peeled off | Significantly peeled off |
| Comparative Example 5 | 9980 | 1.5 | Slightly peeled off | Significantly peeled off |
| Comparative Example 6 | 10884 | 2.7 | Not peeled off | Partly peeled off |

From Table 1, peeling of the ink was not observed in both of the 90° peel test and the folding peel test in the case of Example 5 of the invention.

On the other hand, peeling off of the ink was significant in both tests in the case of the sample which did not contain an adhesion promoter.

In addition, peeling off of the ink was slight in the 90° peel test but peeling off of the ink was significant in the folding peel test in the case of the ethyleneimine polymer (Comparative Example 5) which was synthesized by excessively adding water in the synthetic method of an ethyleneimine polymer according to the present application. Furthermore, peeling off of the ink was not observed in the 90° peel test but peeling off of the ink was partly observed in the folding peel test in the case of the ethyleneimine polymer which was synthesized by excessively adding the catalyst in the synthetic method of an ethyleneimine polymer according to the present application. It is believed that this is because the molecular weight is not sufficient although the degree of dispersion is small and thus the adhesive properties are inferior as in Comparative Example 1 or Comparative Example 5.

From the results in Table 1, it is understood that the ethyleneimine polymer according to the present application exhibits high close adhesive properties as an adhesion promoter for ink.

Comparative Example 1

An ethyleneimine polymer was obtained in the same manner as in the Example 3 except that 2-chloroethanol was changed to sulfuric acid. The molecular weight thereof was measured by GPC, and the result was Mn: 6385 and Mw/Mn: 1.5.

Comparative Example 2

An ethyleneimine polymer was obtained in the same manner as in the Example 3 except that 7.03 g of 2-chloroethanol was changed to 3.70 g of dichloroethane. The molecular weight thereof was measured by GPC, and the result was Mn: 15146 and Mw/Mn: 12.5.

Comparative Example 3

The polymerization reaction of ethyleneimine was conducted in the same manner as in the Comparative Example 2 except that the amount of dichloroethane added was changed to 5.37 g. As a result, the product gelled and it was not possible to measure the molecular weight by GPC.

Comparative Example 4

In conformity with JP 49-33120 B, into a reactor that was equipped with a thermometer, a reflux condenser, and a stirrer and had a capacity of 0.5 L, 18.5 g of ethylenediamine instead of water and 4.87 g of 38% hydrochloric acid were charged and heated. After the temperature was raised to 100° C., 370 g of ethyleneimine was added thereto over 8 hours while maintaining the temperature at 100° C. The resultant was aged for 1 hour at 100° C. after the addition of ethyleneimine was finished, thereby obtaining a solution (or composition) of an ethyleneimine polymer. The molecular weight thereof was measured by GPC, and the result was Mn: 3355 and Mw/Mn: 1.2.

Comparative Example 5

An ethyleneimine polymer was obtained in the same manner as in the Example 3 except that water was increased to 185 g. The molecular weight thereof was measured by GPC, and the result was Mn: 9980 and Mw/Mn: 1.5.

Comparative Example 6

An ethyleneimine polymer was obtained in the same manner as in the Example 1 except that 2-chloroethanol was changed to 29.6 g. The molecular weight thereof was measured by GPC, and the result was Mn: 10884 and Mw/Mn: 2.7.

From the comparison between the Comparative Example 1 and the Example 3, it has been found that the ethyleneimine polymer according to the present application in which 2-chloroethanol, which is a water-soluble mono-halogenated organic compound, is used as a catalyst has a high molecular weight to be 3 times or more than that of the case of a water-soluble inorganic acid not containing halogen although the adding method is different, and the degree of dispersion is suppressed small despite a high molecular weight.

From the Comparative Examples 2 and 3, it has been found that it is impossible to obtain an ethyleneimine polymer that is preferable as an adhesion promoter for ink in the case of using dichloroethane that is poorly soluble in water since the degree of dispersion greatly increases. In addition, gelation was observed in the Comparative Example 3 in which dichloroethane was added at 1.45%. As described above, the invention in which a water-soluble mono-halogenated compound is used as a catalyst has an advantageous effect that an ethyleneimine polymer which has a high molecular weight and a low degree of dispersion and cannot be obtained using a polyhalogenated compound catalyst of the prior art is obtained as one having a low water content.

From the Comparative Example 4, it has been found that a high molecular weight cannot be obtained in the case of adding ethylenediamine at 5% instead of water even in the case of using hydrochloric acid as a catalyst. As can be seen from the Example 13 and the like, a proper water content is required from the viewpoint of obtaining a high molecular weight, and it is believed that the catalyst is easily incorporated into the reaction system when the water content is about 5% and thus a high molecular weight is obtained.

From the comparison between the Comparative Example 5 and the Examples 3, 7, and 8, it is believed that it is

TABLE 2

| No. | Kind of catalyst | Catalyst adding method | Amount of catalyst (wt %) | Water content (wt %) | Polymerization temperature (° C.) | Mn | Mw/Mn |
|---|---|---|---|---|---|---|---|
| Example 1 | 2-chloroethanol | Collective | 1.9 | 5 | 90 | 17494 | 2.6 |
| Example 2 | 2-chloroethanol | Collective | 1.9 | 5 | 80 | 23139 | 2.7 |
| Example 3 | 2-chloroethanol | Continuous | 1.9 | 5 | 100 | 21327 | 2.8 |
| Example 4 | 2-chloroethanol | Continuous | 1.9 | 5 | 90 | 26117 | 2.6 |
| Example 5 | 2-chloroethanol | Continuous | 1.9 | 5 | 80 | 31440 | 2.4 |
| Example 6 | 2-chloroethanol | Continuous | 1.9 | 10 | 90 | 22879 | 2.5 |
| Example 7 | 2-chloroethanol | Continuous | 1.9 | 20 | 100 | 15980 | 2.6 |
| Example 8 | 2-chloroethanol | Continuous | 1.9 | 40 | 100 | 13473 | 1.9 |
| Example 9 | 2-chloroethanol | Continuous | 1.5 | 5 | 90 | 24193 | 2.4 |
| Example 10 | 2-chloroethanol | Continuous | 5 | 5 | 90 | 24324 | 2.7 |
| Example 11 | 3-chloro-1-propanol | Continuous | 2.2 | 5 | 95 | 24352 | 2.7 |
| Example 12 | 2-chloroethoxyethanol | Continuous | 2.9 | 5 | 95 | 24069 | 2.7 |
| Example 13 | Hydrochloric acid | Collective | 0.5 | 5 | 70 | 16177 | 2.6 |
| Example 14 | Hydrochloric acid | Collective | 0.5 | 5 | 90 | 16621 | 2.0 |
| Example 15 | Hydrochloric acid | Collective | 0.5 | 10 | 70 | 18182 | 2.5 |
| Example 16 | Hydrochloric acid | Collective | 0.5 | 40 | 100 | 13209 | 1.9 |
| Example 17 | Hydrochloric acid | Continuous | 0.75 | 5 | 80 | 20831 | 2.8 |
| Example 18 | Hydrochloric acid | Intermittent (6 times) | 0.75 | 5 | 80 | 21140 | 2.9 |
| Comparative Example 1 | Sulfuric acid | Collective | 1.9 | 5 | 100 | 6385 | 1.5 |
| Comparative Example 2 | Dichloroethane | Continuous | 1 | 5 | 100 | 15146 | 12.5 |
| Comparative Example 3 | Dichloroethane | Continuous | 1.45 | 5 | 100 | — (Gelled) | — (Gelled) |
| Comparative Example 4 | Hydrochloric acid | Collective | 0.5 | Not added | 100 | 3355 | 1.2 |
| Comparative Example 5 | 2-chloroethanol | Continuous | 1.9 | 50 | 100 | 9980 | 1.5 |
| Comparative Example 6 | 2-chloroethanol | Continuous | 8 | 5 | 90 | 10884 | 2.7 | possible to synthesize an ethyleneimine polymer having a higher molecular weight, a low degree of dispersion, and a low water content by adjusting the reaction condition so as to have a water content of less than 10% according to the invention.

From the comparison between the Comparative Example 6 and the Examples 4, 9, and 10, it has been found that the sufficient amount of catalyst is about 1.9% by weight and a decrease in molecular weight is caused when the catalyst is excessively added.

From the comparisons between the Example 1 and the Example 4 and between the Example 2 and the Example 5, it can be said that there is a tendency that the molecular weight increases and the degree of dispersion decreases when the catalyst is continuously or intermittently added rather than being collectively added.

Incidentally, this application is based upon the prior Japanese Patent Application No. 2013-164193 filed on Aug. 7, 2013, the entire contents of which are incorporated herein by reference.

The invention claimed is:

1. An ethyleneimine polymer produced by polymerizing ethyleneimine under a temperature condition of from 70° C. to 150° C. in the presence of water at from 1.0 to 40% by mass with respect to 100% by mass of the ethyleneimine and a catalyst at from 0.3 to 5% by mass with respect to 100% by mass of the ethyleneimine, wherein a number average molecular weight (Mn) of the ethyleneimine polymer measured by gel permeation chromatography in terms of pullulan is 13,000 or more and a degree of dispersion of the ethyleneimine polymer is from 1.4 to 3.0.

2. A method for producing an ethyleneimine polymer, the method comprising:
polymerizing ethyleneimine under a temperature condition of from 50 to 150° C. in the presence of water at from 1.0 to 40% by mass with respect to 100% by mass of the ethyleneimine and a catalyst at from 0.3 to 5% by mass with respect to 100% by mass of the ethyleneimine.

3. The method for producing an ethyleneimine polymer according to claim 2, wherein
the catalyst is
a water-soluble organic compound having at least one halogen element and a hydrophilic substituent or
a water-soluble inorganic acid containing a halogen element.

4. The method for producing an ethyleneimine polymer according to claim 2, wherein a method for adding the catalyst is continuous addition.

5. An adhesion promoter for film printing ink comprising: the ethyleneimine polymer according to claim 1.

6. An adhesion promoter for film printing ink comprising: an ethyleneimine polymer produced by the producing method according to claim 2.

7. The ethyleneimine polymer according to claim 1, wherein the number average molecular weight (Mn) is 19,000 or more.

8. The ethyleneimine polymer according to claim 1, wherein the number average molecular weight (Mn) is 25,000 or more.

9. The ethyleneimine polymer according to claim 1, wherein the number average molecular weight (Mn) is 50,000 or less.

10. The ethyleneimine polymer according to claim 1, wherein the degree of dispersion is 2.8 or less.

11. The ethyleneimine polymer according to claim 1, wherein the degree of dispersion is 2.6 or less.

12. The ethyleneimine polymer according to claim 1, wherein the number average molecular weight (Mn) is 31,440 or more and the degree of dispersion is 2.4 or less.

* * * * *